(12) United States Patent
Boxberg et al.

(10) Patent No.: US 11,724,311 B2
(45) Date of Patent: Aug. 15, 2023

(54) COMPONENTS AND THE MANUFACTURE THEREOF VIA WELDING WITH REDUCED ALLOY-DEPLETION

(71) Applicant: INGERSOLL-RAND INDUSTRIAL U.S., INC., Davidson, NC (US)

(72) Inventors: Fredrik Boxberg, Espoo (FI); Juha T. Saari, Espoo (FI); Esa H. M. Vikman, Espoo (FI)

(73) Assignee: Ingersoll-Rand Industrial U.S., Inc., Davidson, NC (US)

(*) Notice: Subject to any disclaimer, the term of this patent is extended or adjusted under 35 U.S.C. 154(b) by 433 days.

(21) Appl. No.: 16/583,676

(22) Filed: Sep. 26, 2019

(65) Prior Publication Data

US 2021/0094098 A1   Apr. 1, 2021

(51) Int. Cl.
*B22F 3/15* (2006.01)
*B22F 5/00* (2006.01)
*B22F 7/08* (2006.01)

(52) U.S. Cl.
CPC .............. *B22F 3/15* (2013.01); *B22F 5/00* (2013.01); *B22F 7/08* (2013.01); *B22F 2301/10* (2013.01);
(Continued)

(58) Field of Classification Search
CPC ...... B22F 3/15; B22F 5/00; B22F 7/08; B22F 2301/10; B22F 2301/20; B22F 2301/35; B23K 2103/18; B23K 2103/22
(Continued)

(56) References Cited

U.S. PATENT DOCUMENTS

| 4,077,109 A | 3/1978 | Larson |
| 4,679,314 A * | 7/1987 | Lenz ................. H02K 9/19 |
| | | 29/598 |

(Continued)

FOREIGN PATENT DOCUMENTS

| CN | 103722294 A * | 4/2014 |
| EP | 0001173 A1 | 3/1979 |

(Continued)

OTHER PUBLICATIONS

CN-103722294-A Translation (Year: 2014).*
(Continued)

*Primary Examiner* — Brian D Walck
*Assistant Examiner* — Danielle Carda
(74) *Attorney, Agent, or Firm* — Kevin E. West; Advent, LLP

(57) ABSTRACT

Systems and methods form induction rotors by performing isostatic pressing (HIP) to weld clad to a shaft, which allows for scaling the manufacturing of solid steel rotors, as compared to conventional techniques. In examples, the rotors are designed for high-speed motors and may include recessed short circuit rings and/or end rings. An exemplary process molds an alloy powder into cladding such that heretofore unachievable rotor designs are achievable according to systems and methods described herein. In examples, a thin source-layer is introduced to welding zones, thereby enriching and strengthening the resulting joint at welding zones. The source-layer may be introduced by adding an intermediate layer comprising the source material between the materials being welded. The reduced alloy-depletion welding disclosed herein strengthens the welding area joints and provides for the manufacture of component designs, which were previously unachievable due to alloy-depletion weaknesses and environmental constraints.

9 Claims, 14 Drawing Sheets

(52) U.S. Cl.
CPC ....... *B22F 2301/20* (2013.01); *B22F 2301/35* (2013.01)

(58) Field of Classification Search
USPC ............................................................ 419/8
See application file for complete search history.

(56) References Cited

U.S. PATENT DOCUMENTS

| | | |
|---|---|---|
| 5,642,853 A | 7/1997 | Lee |
| 2008/0115358 A1 | 5/2008 | Rice et al. |
| 2017/0001244 A1* | 1/2017 | Berglund .................. B22F 3/24 |
| 2019/0202003 A1* | 7/2019 | Molina Mesa ........... B22F 7/08 |

FOREIGN PATENT DOCUMENTS

| | | | |
|---|---|---|---|
| EP | 2528204 A1 | | 11/2012 |
| JP | 2001211615 A | * | 8/2001 |

OTHER PUBLICATIONS

JP-2001211615-A Translation (Year: 2001).*
Office Action in Europe for Application No. 20198323.6, dated Apr. 19, 2023.

* cited by examiner

US 11,724,311 B2

COMPONENTS AND THE MANUFACTURE THEREOF VIA WELDING WITH REDUCED ALLOY-DEPLETION

TECHNICAL FIELD

The present disclosure relates to solid steel rotors and, more specifically but without limitation, components and the manufacture thereof based on solid steel rotors creating according to hot isostatic pressing.

BACKGROUND

Materials, such as metals and thermoplastics, are typically joined via welding, which uses high heat to melt the materials together and cooling thereafter which causes the materials to fuse. Alternatively, materials may be joined via lower-temperature techniques such as brazing and soldering, which melt a bonding material having a melting point that is lower than the materials being joined, in an effort to avoid melting the materials being joined. Typically, of the three bonding techniques, welding creates the strongest structural joints. A brazed joint is structurally stronger than a soldered joint, and soldering creates the weakest structural bond but is sufficient to electronically couple electrical parts when conductive solder is used.

SUMMARY

A first aspect is directed to a method of manufacturing a solid steel rotor. Specifically, the method involves: providing a solid steel rod having a variable diameter in a capsule; providing an alloy powder layer in the capsule positioned around select portions of the solid steel rod, the powder layer comprising alloy material that is different from the steel of the solid steel rod; closing the capsule; introducing the capsule into a hot isostatic pressing chamber; and increasing pressure and temperature within the chamber causing: the powder layer to compress into a cladding, and the cladding to weld to the solid steel rod.

In another aspect, prior to being provided in the capsule, the solid steel rod comprises grooves.

In another aspect, the powder layer is positioned at least in the grooves.

In another aspect, prior to being provided in the capsule, the solid steel rod comprises shoulders, and wherein the cladding forms recessed short circuit rings on the solid steel rod.

In another aspect, the method provides steel end rings in the capsule, wherein the increasing pressure and temperature within the chamber further causes the steel end rings to weld to the solid steel rod and the cladding.

In another aspect, the capsule is a mold, and wherein the increasing pressure and temperature within the chamber further causes the alloy powder layer to compress into a cladding shaped according to the mold.

In another aspect, the method provides an intermediate layer between the solid steel rod and the alloy powder layer at the welding zone.

In another aspect, the intermediate layer comprises at least some material that is the same of the solid steel rod.

In another aspect, providing the intermediate layer includes doping a surface of the solid steel rod.

In another aspect, the intermediate layer diffuses into the solid steel rod and the powder layer.

Another aspect is directed to a method of reduced alloy-depletion welding. Specifically, the method involves: providing a first alloy comprising a first material; providing a second alloy that accumulates the first material when welded to the first alloy; introducing a source-layer at a welding zone of the first alloy and the second alloy, wherein the source-layer comprises the first material; and welding the first alloy and the second alloy at the welding zone.

In another aspect, the source-layer is an intermediate layer provided between the first alloy and the second alloy at the welding zone.

In another aspect, no intermediary layer is provided between the first material and the second material.

In another aspect, the introducing a source-layer includes doping a surface of at least one of the first alloy and the second alloy with the first material.

In another aspect, upon the welding the first alloy and the second alloy at the welding zone, the source-layer is diffused into the first alloy and second alloy.

Another aspect also includes: introducing a plurality of source-layers at a plurality of welding zones of the first alloy and the second alloy, wherein the source-layer comprises the first material; and welding the first alloy and the second alloy at the plurality of welding zones.

In another aspect, the first layer is powder.

In another aspect, the first layer is a cylinder.

In another aspect, the first layer is a plurality of cylinders.

In another aspect, the first layer is one or more of cylinders and bars.

In another aspect, the first alloy is a copper alloy, wherein the first material is chromium, and wherein the second alloy comprises steel.

In another aspect, the welding is hot isostatic pressing.

Another aspect is directed to a method of manufacturing an electro-magnetic rotor. Specifically, the method of manufacturing includes: filling a capsule with a first alloy comprising a first material, a second alloy that accumulates the first material when welded to the first alloy, and a source-layer at one or more welding zones of the first alloy and the second alloy, wherein the source-layer comprises the first material; enclosing the capsule around the first alloy, the second alloy, and the source-layer; and welding the first alloy and the second alloy at the one or more welding zones of the first alloy and the second alloy inside a hot isostatic pressing.

In another aspect a steel rotor is provided having a continuous cylinder of conductive cladding around a portion of the rotor and between two short circuit rings on the rotor.

In another aspect the steel rotor includes shoulders adjacent or near axial edges of the continuous cylinder and/or the short circuit rings.

In another aspect steel end rings are provided adjacent or near the axial edges of the short circuit rings.

In another aspect channels or grooves are provided in the steel rotor radially inside the continuous cylinder and the channels or grooves are filled, at least partially, with conductive cladding material electrically connected to the short circuit rings.

In another aspect the conductive cladding material in the channels or grooves is electrically connected to the continuous cylinder of conductive cladding which may circumscribe the channels or grooves.

In another aspect the rotor comprises recessed short circuit rings providing reduced current densities over non-recessed short circuit rings of the same outer diameter.

BRIEF DESCRIPTION OF THE DRAWINGS

Corresponding reference characters indicate corresponding parts throughout the drawings.

DETAILED DESCRIPTION

Figure 1A:
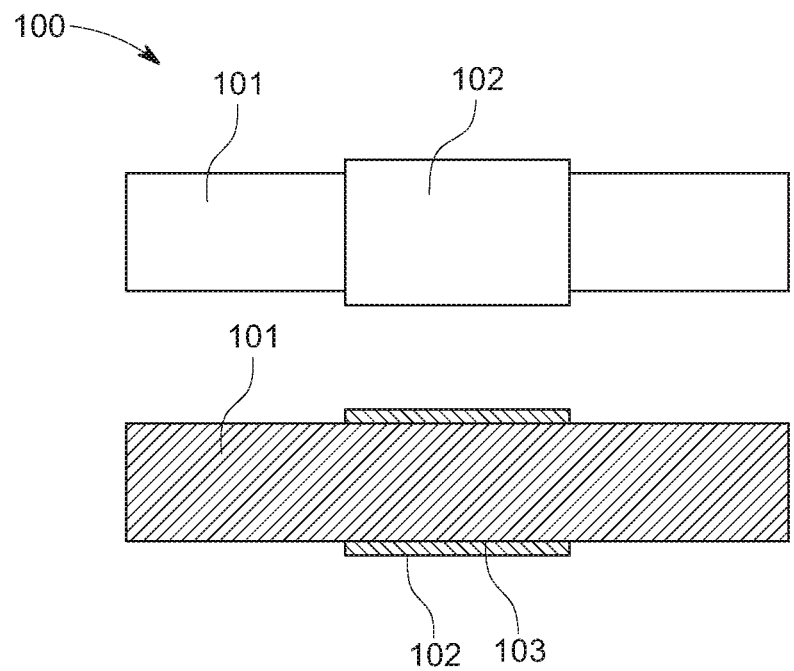
FIGS. 1A-1C illustrate several views of an example rotor.

Bonded high-speed components, for example components of induction rotors of an electric motor, have traditionally been impossible to manufactured according to conventional bonding techniques because the bonded components struggle to maintain bond integrity at high speeds unless the bond has a tensile strength of 400 MPa (megaPascal) or more. Welding, brazing, and soldering have been unable to ensure sufficiently high tensile bond strength, so conventional manufactures have resorts to explosion welding techniques in order to achieve the high tensile strength bonds desired for rotors.

Unfortunately, explosion welding brings several challenges to manufacturing processes, especially in the manufacture of induction rotors. For example, the stochastic tendencies of explosion welding prevent consistent maintenance satisfactory yields. Typically, unavoidable variations within single a sample and within batches of samples undermine quality control efficiencies. For example, when bonding components of an induction rotor, explosion welding causes bond uniformity and rotor dimensions to vary outside acceptable tolerances. Further, the rate at which induction rotors are bent as a result of the explosion welding process is inefficiently high. As such, the use of explosion welding to bond components of induction rows erode manufacturing uniformity, which is costly. Further still, conventional explosion welding causes residual stresses, which negatively affect long term instability and typically cause rotor imbalances.

Further, explosion welding has not successfully scaled to batch processing, constraining manufactures to perform explosion welding serially. As such, induction rotors are made one at a time, severely slowing the production process.

Moreover, explosion welding involves a detonation progression, which limits the variations of rotor designs and the materials used therein. In a cladded steel rotor example, hollow cylinder cladding is slipped over a steel rotor that typically has a constant diameter. Next, explosion welding bonds the cladding to the steel rod. Thereafter, the cladded steel rotor is machined into a desired design. Due to the order of the processing steps and detonation progression, rotor design limitations have heretofore prevented high speed induction rotors from keeping pace with other electric motor advancements.

Additionally, explosion welding is typically restricted to outdoor locations because the explosion process is not conducive to indoor environments or conditions. This environmental constraint increases as the size of the rotor increases, for example, when manufacturing large rotors where the amount of explosives corresponds to tens of kilograms of trinitrotoluene (TNT) equivalents. As a result, ambient conditions and related process parameters have proven to be difficult to control with any consistency, which detrimentally effects welding quality and causes manufacturing delays. Furthermore, explosion welded rotors in particular are meet with increased caution stipulations as well as specialized safety standards and procedures, which are tested prior to rotor machining is performed. This quality testing proves to be excessively thorough, which further increases manufacturing costs and liability considerations.

The embodiments and examples described herein perform alternative welding techniques that successfully bond components of high speed objects with high tensile bond strengths that previously were only attainable via explosion welding. Further, examples herein alleviate difficulties caused by explosion welding, which allows the manufacture of high speed objects to scale, provides for complex components designs that were previously unachievable, and increases the variety of materials that may be used to create the rotors.

Example systems and methods herein bond components of induction rotors according to hot isostatic pressing (HIP). HIP is a manufacturing process traditionally utilized to reduce a material's porosity and increase a materials density. Examples herein utilize HIP to form, mold, and/or bond different objects to each other.

In examples, two or more objects are positioned inside a capsule, which is placed inside a high pressure chamber and subjected to isostatic gas pressure and elevated temperatures. During the process, the chamber and inert gas is heated, causing the pressure inside the capsule to increase. The isostatic pressure presses the objects against each other at a temperature where at least one of them approaches its melting point. The process causes the objects to form and/or permanently join (e.g., weld) to each other. It is noted that several objects (two or more) may be formed and/or welded into a single entity during a single heating pressure increasing process. Furthermore, materials used in the process may be a variety of forms, for example, solid, powder, liquid, gas, and/or the like.

Bonding techniques disclosed herein provides for the successful manufacturing of solid-steel induction rotors (e.g., electro-magnetic rotor) for electric motors that are particularly well suited for serial production. Coating a rotor shaft via HIP provide for new rotor design options which previously have been unattainable, for example, the manufacture of rotors for high-speed motors (e.g., electrical high-speed motors). When manufacturing solid-steel induction rotors, it is desirable to bond a first material to the steel rotor, which is a second material.

High-speed motors are preferably based on the use of a solid-steel induction rotor in contrast to certain squirrel cage rotors and permanent magnet rotors. The use of a solid steel rotor is motivated by the high mechanical loading that solid steel rotors achieve at fast rotation speeds, despite typically having a lower electrical efficiency. The electrical efficiency of a solid steel rotor may be improved by coating the rotor with a mechanically strong and electrically well conducting material, which may be referred to as cladding. In examples, dads may include copper, a copper alloy, and/or a similarly mechanically strong and electrically well-conducting material. Conventionally, dads are welded to the shaft by explosion welding because other bonding and/or welding techniques were heretofore unable create a bond with sufficient strength and uniformity. However, explosion welding is poorly suited for serial production due to the explosion welding constraints described above.

Figure 1B:
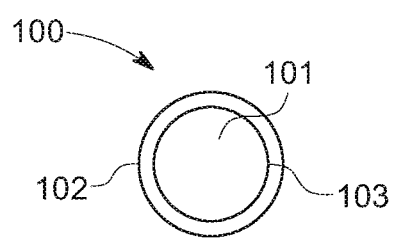
Figure 1C:
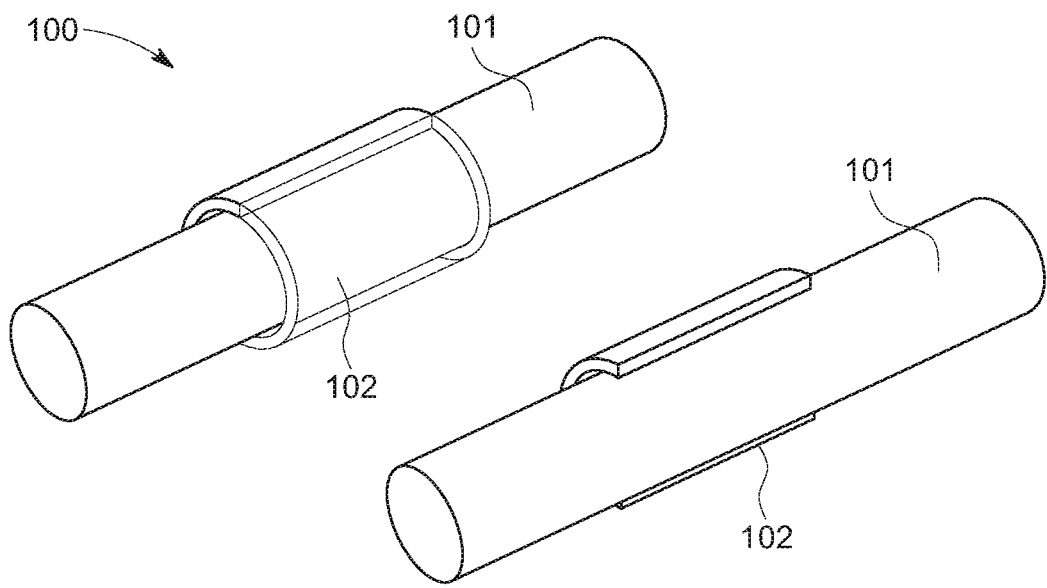

FIGS. 1A-1C illustrate several views of an example rotor 100. In examples, the shaft 101 comprises steel, and a clad 102 forms a uniform layer on the surface of shaft 101. Bond zone 103 is the interface between shaft 101 and clad 102. A rotor of the design of FIG. 1A provides numerous benefits over many alternate designs. In examples, rotor 100 may be altered to comprise grooves, clad, short-circuit rings, shoulders, and/or end rings, if desired. Some or all of the weld zones of the shaft, clad, rings, and/or any other portion of the rotor may be strengthened via source-layers and/or barrier layers, as is described further below. Short-circuit rings are typically included on solid steel induction rotors to assist with the electro-magnetic operation of the rotor by closing the electric current loops at the rotor surface. Conventional short-circuits rings of solid steel rotors are typically created by first explosion welding clad 102 to shaft 101, and then, machining the clad to be thicker at its ends. But machining the clad to be thicker at its ends causes conventional rotors to have unfortunately thick designs with poor mechanical properties. Nonetheless, the convention of machining thicker ended dads were previously tolerated because conventional practice relied on explosion welding for clad bonding and explosive welding caused dads to be thicker at their ends.

Figure 1D:
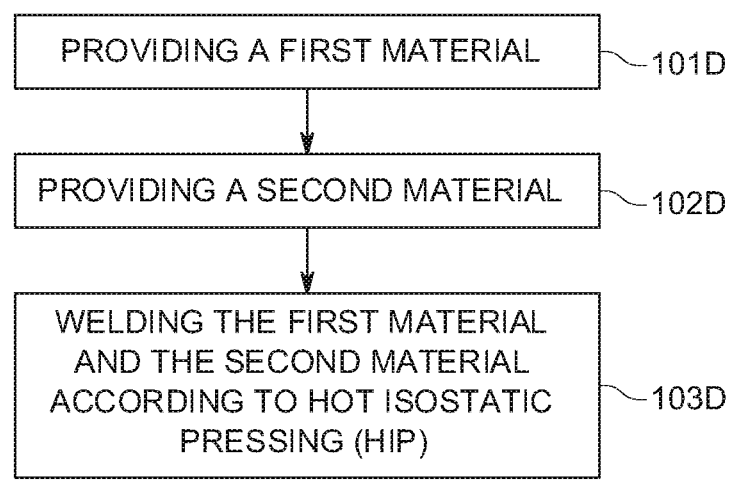
FIG. 1D is a block diagram illustrating an example method of making a rotor.

FIG. 1D is a block diagram illustrating an example method of making a rotor. In this example, method 100D performs hot isostatic pressing (HIP) to manufacture a solid rotor, as opposed to conventional explosion welding. Operation 101D provides a first material (e.g., alloy). Operation 102D provides a second material (e.g., alloy). In examples, the first material is different from the second material. In examples, the first material is the same material as the second material. At operation 103D, hot isostatic pressing (HIP) welds the first material and the second material. In some instances, the interior dimensions of the capsule may be shaped to function as a mold and/or cast.

In examples, the first material is different from the second material. In examples, the first material is the same material as the second material. Optionally, any number of additional materials may be disposed in the open capsule, and any of the additional materials may be the same or different from the first and/or second materials. Further, various forms of the various materials may be used. For example, the first material may or may not be a unitary piece that is separate from the second material, which may or may not be a unitary piece. Non-unitary material may comprise rods, bars, powders, liquids, gels, gases, and/or other forms that are shaped into a component part during the HIP process. Certain forms of a material may be desirable over others, for example, based on the characteristics and design of the rotor. For instance, complicated designs and thinner component parts may be more easily achieved using powder as a source material as compared to rods. Further, specific characteristics of some alloys may be precisely controlled when the source material of the alloy is in a specific form. For example, the characteristics of dispersion strengthened alloys may be precisely controllable when formed from powder source material as compared to rods.

Figure 2A:
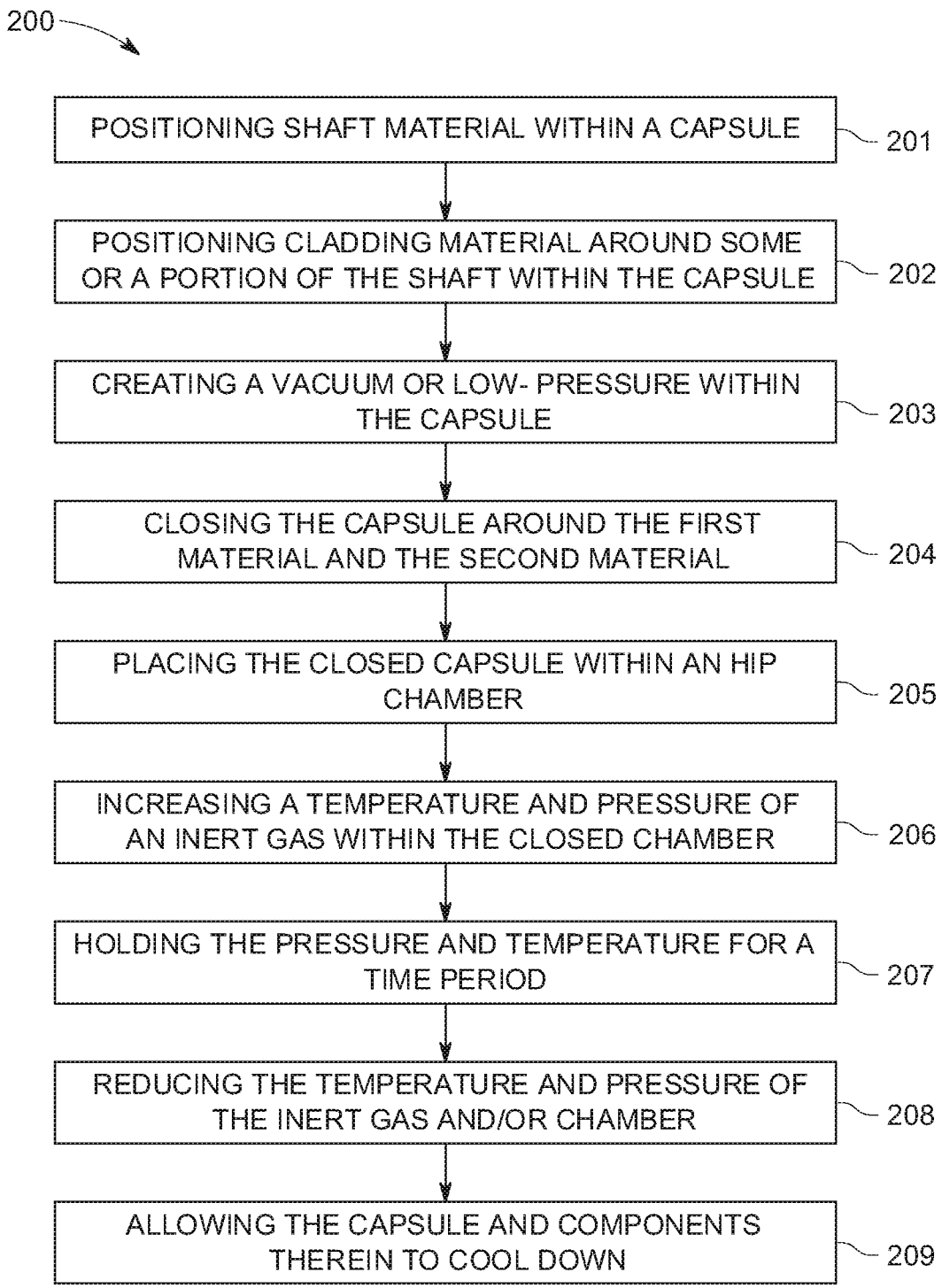
FIG. 2A is a block diagram illustrating an example method of making a rotor.

FIG. 2A is a block diagram illustrating an example method of making a rotor. In this example, method 200 performs hot isostatic pressing (HIP) to weld cladding to a shaft. In examples, the process may be used to manufacture induction rotors, which may be designed for high-speed motors. In this example, which may be combined with any example herein, a solid steel shaft and a copper cylinder are used as source materials, but any materials may be used to substitute the steel, any material may be used to substitute the copper, and any further materials, albeit steel, copper, or another material, may additionally be used, if desired. In examples, the shaft may be a different material or the same material as compared to the cylinder and/or another material.

At operation 201, shaft material may be positioned within a capsule. The shaft may be steel material or any other suitable material. In this example, the shaft is a unitary solid steel shaft. At operation 202, cladding material may be positioned around some or a portion of the shaft within the capsule. In examples, a cylinder of clad material is slipped over a solid shaft and placed in the capsule. In another example, powder may be positioned around the shaft in the capsule. The cladding may be copper or any other suitable material.

During operation 203, a vacuum or low-pressure is created within the capsule before closing the capsule. At operation 204, the capsule is closed around the first material and the second material (e.g., welded shut). At operation 205, the closed capsule is placed within a closed HIP chamber. During operation 206, an inert gas within the closed chamber is heated until the gas pressure and temperature reach their holding values. At operation 207, the pressure and temperature are held for a time period, which may be determined based on the characteristics of the materials within the capsule as well as characteristics of a desired bond strength. During operations 205 and 206, the first and the second material merge and weld to each other as a result of the very high gas pressure and temperature. When a sufficiently strong bond has been ensured (e.g., expiration of the time period), operation 208 reduces the gas temperature and pressure. During operation 209, capsule and the components therein are allowed to cool down and may be inspected for eventual faults. After the HIP process, final machining and assembly of the formed item may be performed.

Figure 2B:
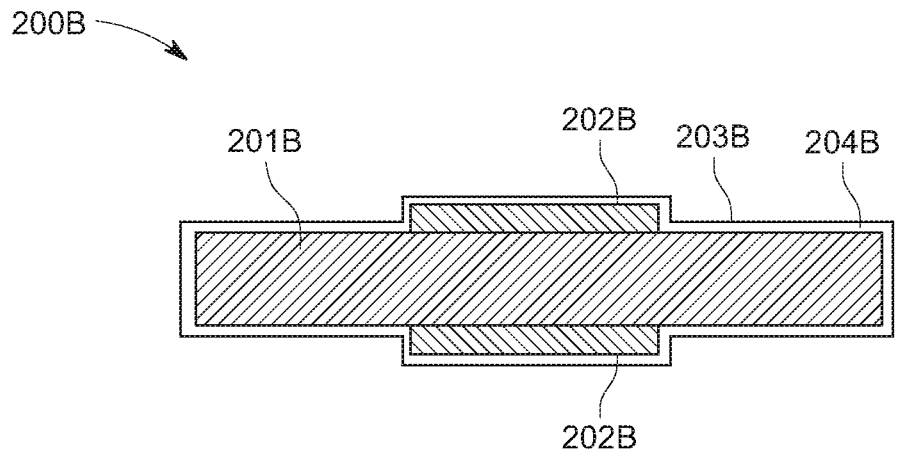
FIG. 2B is a block diagram illustrates an example capsule.

In instances, the interior of the capsule may be shaped as a mold and/or cast, such that the capsule forms the source material into a desired shape. FIG. 2B is a block diagram illustrates an example capsule 200B. In examples, capsule 200B may be used during a HIP process. Capsule 200B includes an exterior housing 203B and an interior mold 204B (e.g., cast). Shaft material 201B and cladding material 202B located inside interior mold 204B. In examples, shaft material 201B may be solid, rods, bars, a cylinder, powder, liquid, gel, gas and/or the like. For instance, shaft 201B may be a solid steel shaft. Cladding 202 solid, rods, bars, a cylinder, powder, liquid, gel, gas, and/or the like. For instance, cladding 202 may be a copper alloy powder that is held in position by interior mold 204. In examples, during an HIP cycle, the exterior shape of cladding 202 may compress and form (e.g., mold) into the shape of interior mold 204; the interior shape of cladding 202 may compress and form (e.g., mold) into the shape of the exterior of shaft 201B; and cladding 202 may weld to shaft 201B at all weld zones.

Figure 2C:
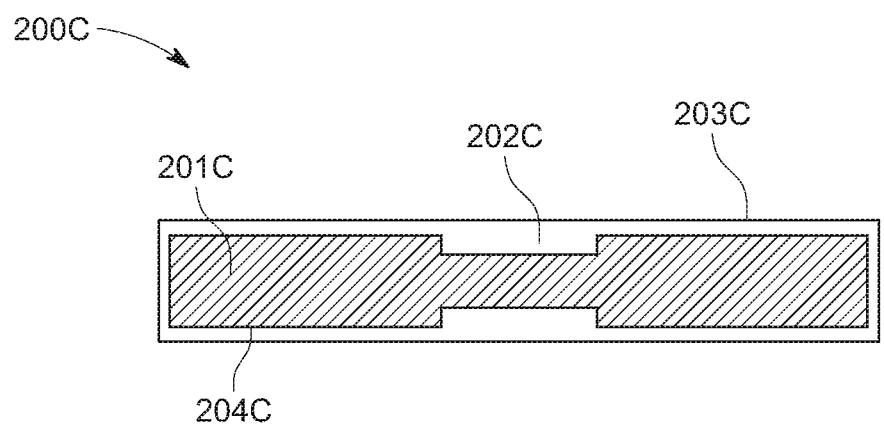
FIG. 2C is a block diagram illustrates an example capsule.

FIG. 2C is a block diagram illustrates an example capsule 200C. In examples, capsule 200C may be used during a HIP process. Capsule 200C includes an exterior housing 203C and an interior mold 204C (e.g., cast). In this example, shaft 201C is solid steel, and the clad is created via the compression of powder source material 202C (e.g., copper alloy). The use of powder source material 202C enables the use of unique materials during rotor manufacturing, for example, materials that are not conducive to explosion welding. In examples, an intermediary layer, which may be one or more of a barrier layer and a source-layer (e.g., comprising nickel, chromium, and/or the like) may be included between shaft 201C and clad 202C to improve the bond thereof, as is explained below. In alternate examples, an intermediary layer may be omitted (not used) when desirable (e.g., slimmer design, save money, in instances when chemical properties of the clad or shaft cause an intermediary layer to be superfluous, varying product designs, objectives, and characteristics and/or the like). In other words, aspects of the present invention include the use of one or more intermediary layers and, in other examples, aspects of the present invention do not use any intermediary layers.

Figure 3A:
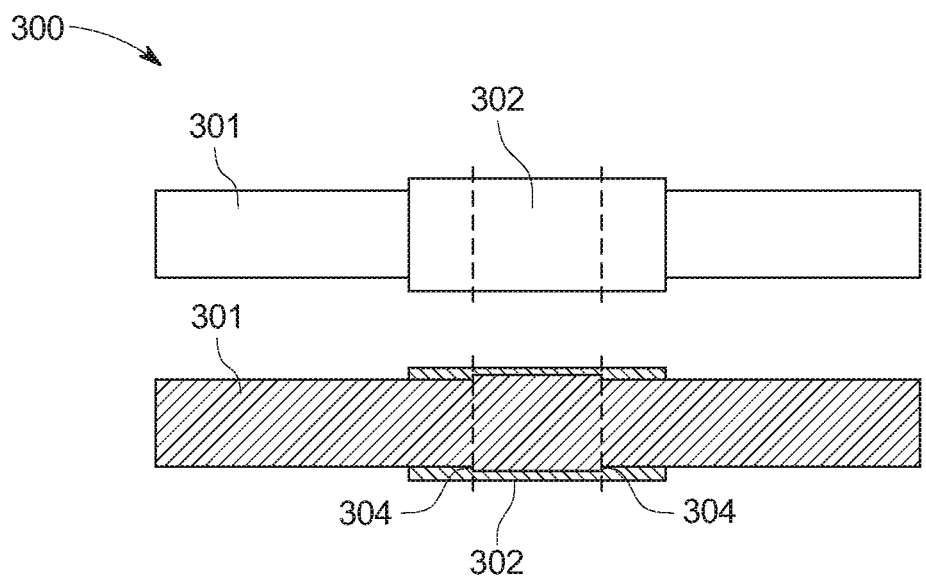
FIGS. 3A-3C illustrate several views of an example rotor.
Figure 3B:
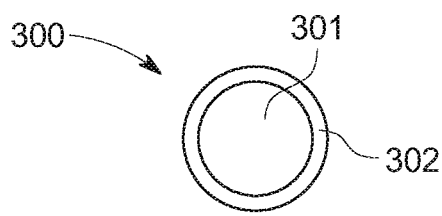
Figure 3C:
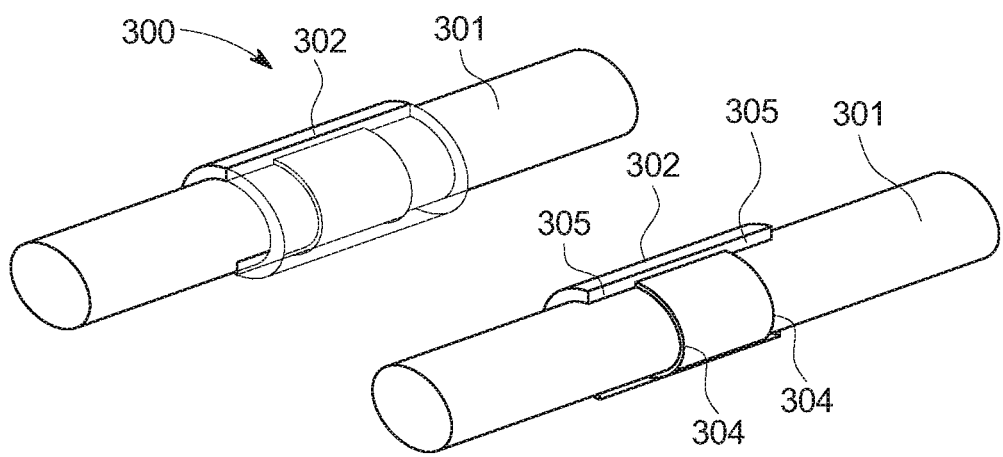

FIGS. 3A-3C illustrate several views of an example rotor, for example, a solid-steel induction rotor 300 of a slimmer design. Bonding techniques described above enable the manufacture of solid-steel induction rotor 300, which comprises a steel shaft 301, clad 302, and recessed short-circuit rings 305. Because the short-circuit rings 305 are recesses as opposed to being machined to have thickened clad ends, the recessed short-circuit rings 305 enable a slimmer rotor design with improved mechanical properties and electrical properties that were heretofore unrealizable. The thickened short-circuit rings 305 provide a reduced current density in the short-circuit rings 305 than if the short-circuit rings had only the radial cross-sectional dimension of the clad section 302 while still providing an overall slimmer (reduced radius) design rotor. During production, shaft 301 comprises steel and is machined to include shoulders 304. Clad 302 and recessed short-circuit rings 305 are then joined to shaft 301 via HIP welding. In examples, the rings, clad, and shaft may all welded to each other during a single HIP cycle. If desired, more than one HIP cycle may be utilized to weld various portions of the induction rotor 300. Some or all of the weld zones of the shaft, clad, rings, and/or any other portion of the rotor may be strengthened via source-layers and/or barrier layers, as is described below.

Figure 3D:
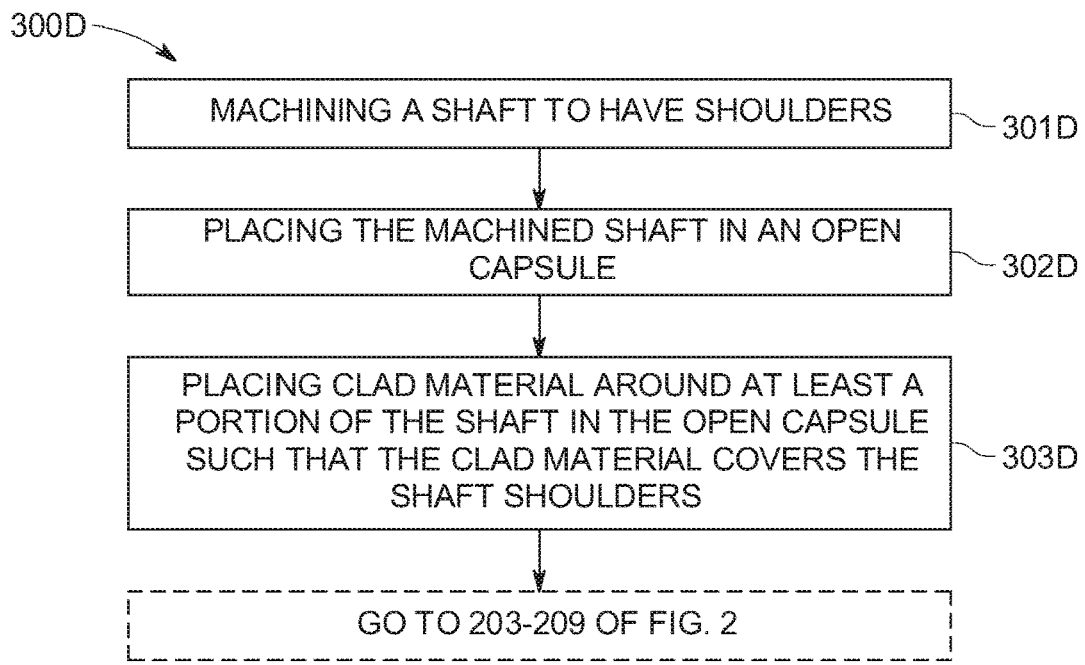
FIG. 3D is a block diagram illustrating an example method of making a rotor.

FIG. 3D is a block diagram illustrating an example method of making a rotor. In this example, method 300D performs hot isostatic pressing (HIP) to weld clad to a shaft. In examples, the process may create induction rotors, which may be designed for high-speed motors. In this example, which may be combined with any example herein, recessed short-circuit rings are provided. At operation 301D, a shaft (e.g., steel) is machined to have shoulders. At operation 302D, the machined shaft is placed in an open capsule. At operation 303D, clad material (e.g., a cylinder, powder, solid material, etc.) is placed around at least a portion of the shaft in the open capsule such that the clad material covers the shaft shoulders. After all materials intended to be welded to the rotor via HIP are positioned within the capsule, the method may perform operations 203-209 (shown above).

In examples, the clad material is copper. Generally, short-circuit rings close the electric current loops at the rotor surface, such that induced voltage generates a flow of current. Conventionally, short-circuits rings of solid steel rotors were manufactured by bonding cladding to the solid steel rotor and thereafter machining the clad, such that the clad is somewhat thicker at its ends. In contrast, some of the examples herein (e.g., FIGS. 3A-3D, 4A-4B, and 5A-5D), create recessed short-circuit rings, which is an improvement over conventional systems, methods and designs because the recessed short-circuit rings cause an overall slimmer rotor design with improved mechanical and electrical properties. Examples herein are a further improvement over the post-welding machined short circuit rings because after the bonding process (e.g., HIP processes as described herein), the short circuit rings are complete, and the cladding does not require additional machining in order to properly function as short circuit rings. Avoiding the machining of the short circuit rings after welding the short circuit rings to the shaft is especially important when additional components are welded to the short circuit rings and the shaft, for example, extra rings such as end rings.

Figure 4C:
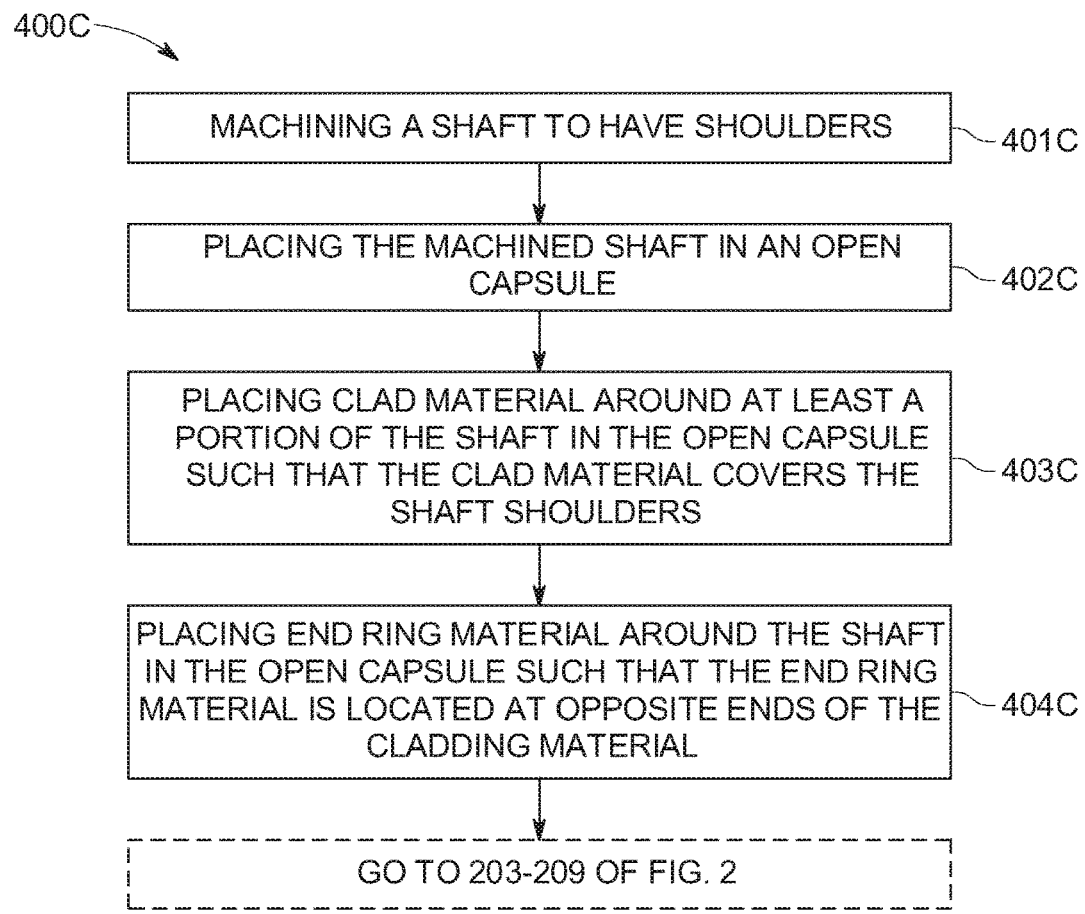
FIG. 4C is a block diagram illustrating an example method of making a rotor.
Figure 4A:
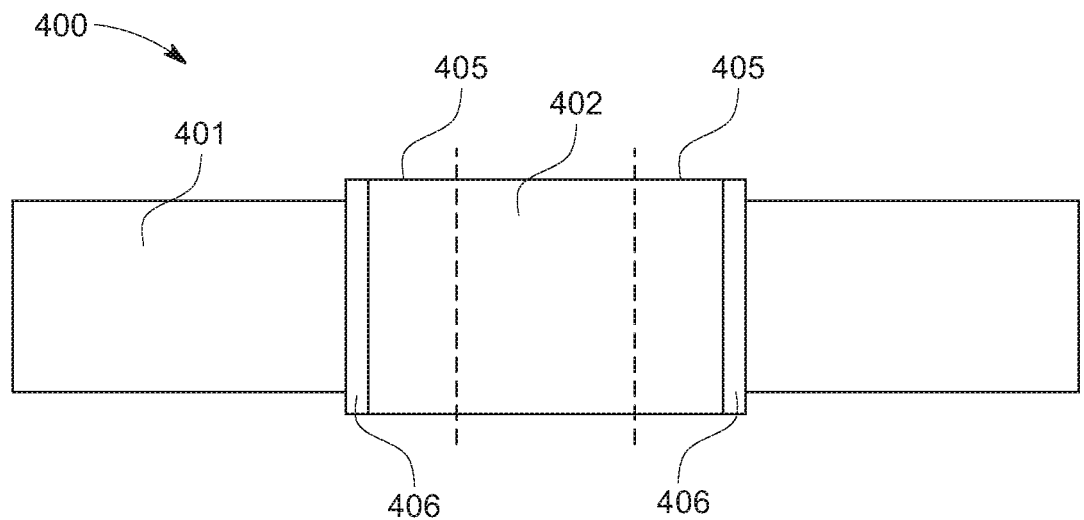
FIGS. 4A-4B illustrate several views of an example rotor.
Figure 4B:
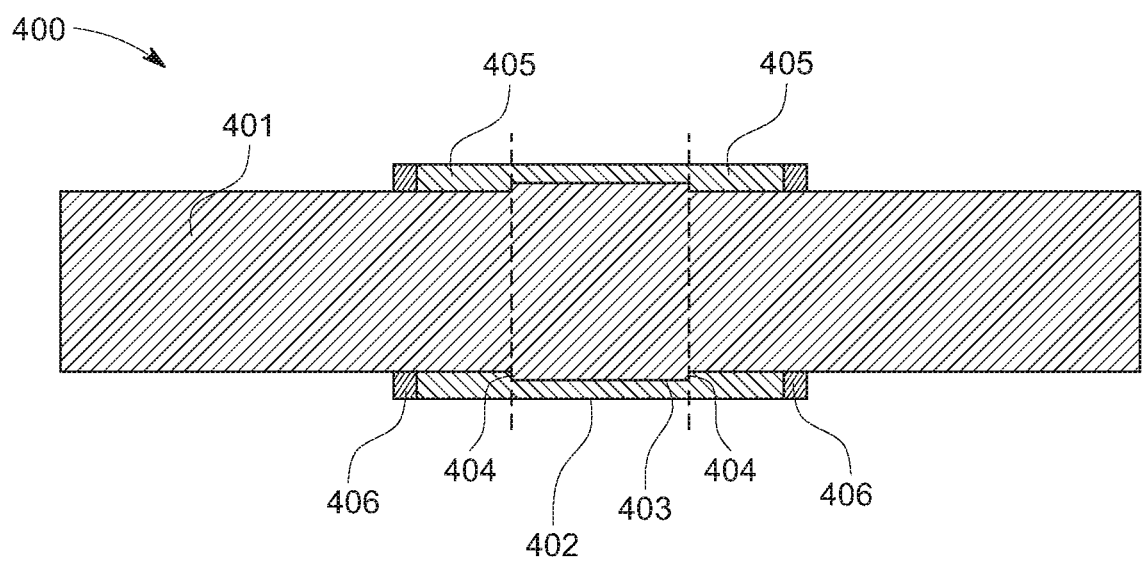

FIGS. 4A-4B illustrate several views of an example rotor, for example, solid-steel induction rotor 400. In this example, the shaft 401 comprises steel and is machined to include shoulders 404. Clad 402 forms a layer on the surface of shaft 401 and extends over shoulders 404. Weld zone 403 joins the steel shaft 401 and the clad 402. In examples, extra rings 406 (e.g., end rings) are added next to short-circuit rings 405. In examples, end rings 406 may comprise an alloy (e.g., steel). The extra rings 406 may be improve the structural integrity of the rotor and may also be used in conjunction with magnetic bearings (not shown) to operationally position the rotor in a desired axial position. In examples, one or more of the rings, clad, and shaft may all be welded to each other during a single HIP cycle. If desired, more than one HIP cycle may be utilized to weld various portions of the rotor. Some or all of the weld zones of the shaft, clad, rings, and/or any other portion of the rotor may be strengthened via source-layers and/or barrier layers, as is described below.

FIG. 4C is a block diagram illustrating an example method of making a rotor, in this example, method 400C performs a hot isostatic pressing (HIP) cycle to weld clad to a shaft. In this example, which may be combined with any example herein, recessed short-circuit rings and separate end rings are welded to the shaft, for example, in a single welding/bonding process. At operation 401C, a shaft (e.g., steel) is machined to have shoulders. At operation 402C, the shaft is placed in an open capsule. At operation 403C, clad material (e.g., a cylinder, powder, solid material, etc.) is placed around at least a portion of the shaft in the open capsule such that the clad material covers the shaft shoulders. In examples, the clad material is copper. In some examples the clad material may comprise a plurality of cylinders or rings such as, for example, a separate cylinder shown at 405, at 402, and again at 405. Further, in examples, separate cylinders or rings as shown at 406 may be positioned on the shaft. At operation 404C, end ring material (e.g., rings, solid material, powder material, etc.) is placed around the shaft in the open capsule such that the end ring material is located at opposite ends of the cladding material. In instances, the end ring material may not come into contact with the shoulders. In examples, the end ring material may be steel. In an example, the end rings are located a distance (x) from the shaft shoulders. The end rings may improve the structural integrity of the rotor as well as be used in conjunction with magnetic bearings (not shown).

In examples, additional materials may be positioned within the capsule if desired. After all materials intended to be welded to the rotor via HIP are positioned within the capsule, the method may perform operations 203-209 (shown above). In instances, a steel shaft and a solid copper cylinder may be used as source materials, but any materials may be used to substitute the steel, any material may be used to substitute the copper, and any further materials, albeit steel, copper, or another, may be additionally be used if desired. In examples, the shaft may be a different material as compared to the cylinder. Further, after the HIP process of the rotor, final machining and assembly of the rotor may be performed.

FIGS. 5A-5D illustrate several views of an example rotor, for example, a solid-steel induction rotor 500 having axial conductors, which may improve the electrical efficiency of the rotor 500 over a design such as that of FIG. 1 which does not include grooves 507 and over a design which only has conductive material in grooves without a conductive cladding "cylinder" surrounding the grooves 507 as described herein. Shaft 501 comprises a first material (e.g., steel) that is machined to have grooves 507 and shoulders 504. In examples, clad material 502 fills grooves 507 to create an axial conductor. Examples of clad material 502 includes one or more copper cylinders, copper bars, copper powder, and/or the like. The clad material 502 is assembled onto the shaft and fills the voids and grooves 507 of the shaft 501. During the HIP process, clad material 502 forms a single unitary layer having thickness variations corresponding to the exterior shape of the shaft 501. For example, during an HIP cycle, as a result of the high pressure, the clad material 502 fills the voids and grooves 507 of the shaft 501 and bonds thereto. If desired, steel end rings (not shown) may also be added to the rotor. In examples, one or more of the end rings, clad material 502, and shaft 501 may all be welded to each other during a single HIP cycle. If desired, more than one HIP cycle may be utilized to weld various portions of the rotor. Some or all of the weld zones 503 of the shaft, clad, rings, and/or any other portion of the rotor may be strengthened via source-layers and/or barrier layers, as is described below.

Figure 5A:
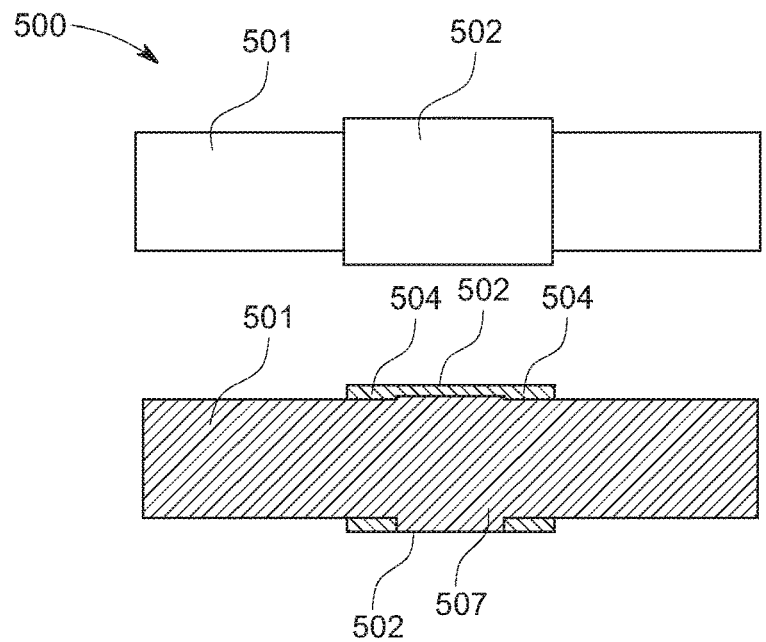
FIGS. 5A-5D illustrate several views of an example rotor.
Figure 5B:
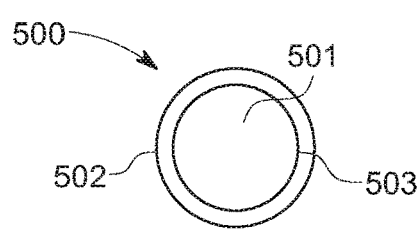
Figure 5C:
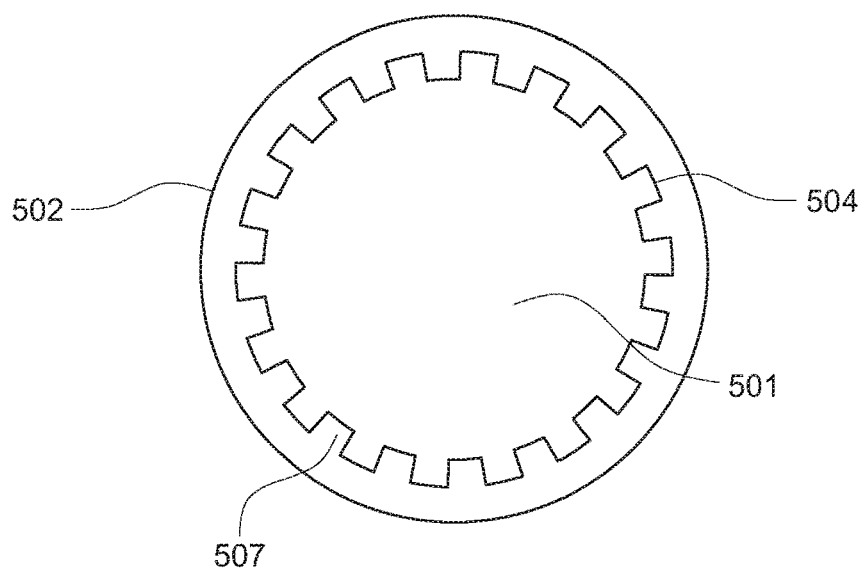
Figure 5D:
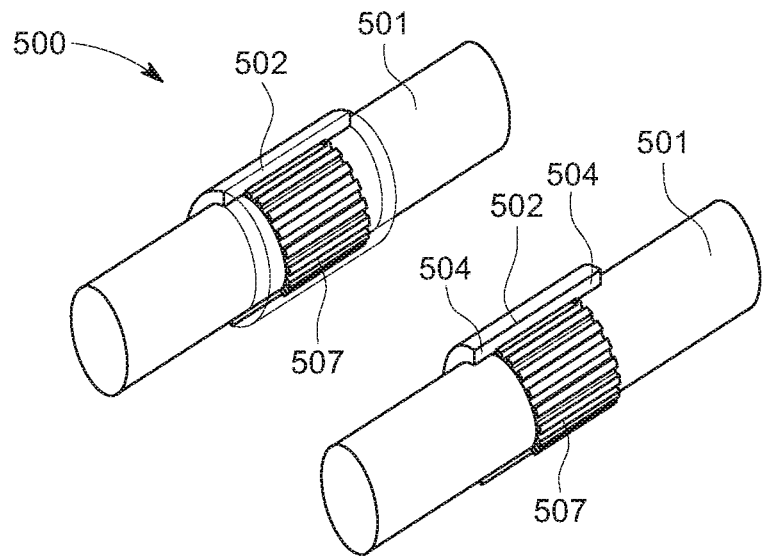
Figure 5E:
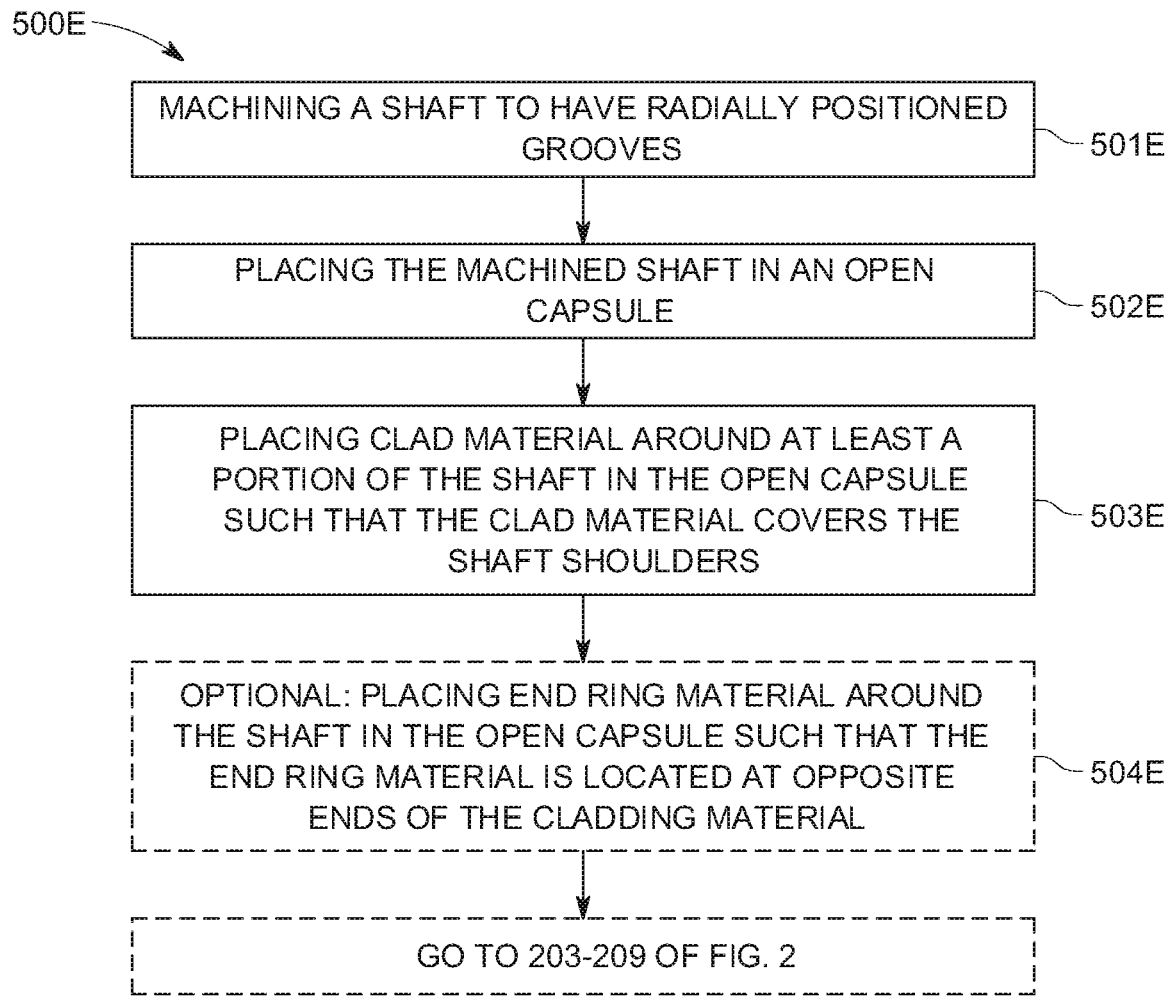
FIG. 5E is a block diagram illustrating an example method of making a rotor.

FIG. 5E is a block diagram illustrating an example method of making a rotor. In this example, method 500E performs a hot isostatic pressing (HIP) cycle, which welds clad to a shaft. In examples, the process may create induction rotors, which may be designed for high-speed motors. In this example, which may be combined with any example herein, the rotor is manufactured to additionally include axial conductors. At operation 501E, a shaft is machined to have radially positioned grooves. During operation 501E, the rotor may optionally be machined to have shoulders. At operation 502E, the shaft is placed in an open capsule. At operation 503E, clad material (e.g., cylinder, powder, solid material, and/or the like) is placed around at least a portion of the shaft in the open capsule such that the clad material covers the grooves and the optional shaft shoulders. In examples, the clad material is copper. In examples, the clad material may fit into the grooves (e.g., powder may be positioned within the grooves of the shaft).

If desired, end rings may be included in the methods. At optional operation 504E, end ring material (e.g., rings, solid material, powder material, etc.) is placed around the shaft in the open capsule such that the end ring material is located at opposite ends of the cladding material. In instances, the end ring material may not come into contact with the grooves and/or optional shoulders. In examples, the end ring material may be steel. In an example, the end rings are located a distance (x) from the grooves and/or optional shoulders.

In examples, additional materials may be positioned within the capsule if desired. After all materials intended to be welded to the rotor via HIP are positioned within the capsule, the method may perform operations 203-209 (shown above). As explained above, a steel shaft may be a first material and copper may be a second material that are used as source materials, but any materials may be used to substitute the steel, any material may be used to substitute the copper, and any further materials, albeit steel, copper, or another, may be additionally be used if desired. In examples, the shaft may be a different material as compared to the cylinder. Further, after the HIP process of the rotor, final machining and assembly of the rotor may be performed.

In any example disclosed herein, an interface material may be positioned between various materials being joined (e.g., the clad and the shaft). In examples, the thickness of the interface material may be from a few nanometers up to a few micrometers, depending on the materials and the application. The use of an interface material is optional, but may improve the bonding between the clad and the shaft. It may also prevent or reduce diffusion between the materials to be joined. In examples, the interface material may be based on nickel or chromium. It should be noted that in some examples no interface material may be utilized.

Further, in any example disclosed herein, the different rings and the shaft may all be welded to each other during one HIP cycle. Additionally, and/or alternatively, different rings and the shaft may be welded to each other during a series of HIP cycles, and in examples, the rotor may be machined between one or more of the series of HIP cycles.

From time to time, bonding a first material to a second material via HIP may be difficult. Aspects of this disclosure enable materials to be bonded with increased structural integrity. Conventional bonding techniques typically weaken joints at the bonding area of materials due to the diffusion of elements between the joined materials. Typically, element diffusion causes element depletion of the material having a higher concentration of the diffusing chemical species, and usually the element depletion occurs at the bonding area of the materials being joined. Conventionally, this element depletion causes a weaken joint between the bonded materials. The embodiments and examples disclosed herein solve complications conventionally caused by compound depletion at bonding areas at least by introducing one or more source-layer at the bonding area. Introducing a controllable source-layer at the bonding area controllably mitigates compound depletion of the material having a higher concentration of the diffusing chemical species thereby improving the strength of material joints. In examples, the source-layer may be controllably introduced in manners that cause a bonded joint to exhibit structural integrity that exceeds the individual materials being joined together.

Previously, several component designs were unachievable because the manufacturing process caused structural weaknesses at bonding areas due to the above described element depletion problems. Embodiments disclosed herein constructively control element diffusion to prevent element depletion from weakening bonding area joints and the materials being joined, making complex designs that were previously unachievable now attainable. While HIP is discussed herein with respect to the constructive control of diffusion, other bonding processes may be used if desired. Examples include, without limitation, friction welding, gas metal arc welding, gas tungsten arc welding, shielded metal arc welding, flux-cored arc welding, electron beam welding, atomic hydrogen welding, plasma arc welding, soldering, and/or the like. Further, systems and methods disclosed herein may also be used with explosion welding, if desired.

Embodiments disclosed herein are not limited to any specific geometry and may be applied to any geometry, including planar, tubular, cylindrical, cubic, spherical, quadrilateral, and/or the like including complex geometries. The combination of bonding with a source-layer via HIP enables the manufacturing of structures that were previously impossible to create with integrity, and these new structures provide operational advantages for many applications, for example electrical motors.

Figure 6A:
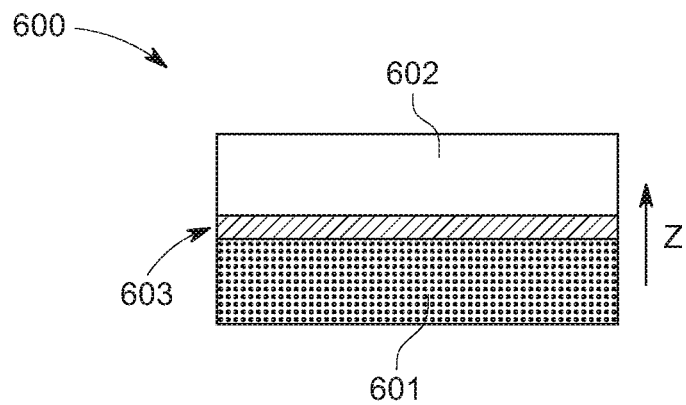
FIG. 6A is an exemplary block diagram illustrating bonded materials.

FIG. 6A is an exemplary block diagram illustrating bonded materials. In examples, component 600 may be a cross section of a solid steel rotor. The first material 601 comprises a higher concentration of an element as compared to the second material 602. Joining first material 601 and second material 602 causes diffusion of one or more chemical substance across the bond zone 603. The diffusion rate may accelerate with increasing temperature and depends on the materials to be joined. Typically, diffusion becomes significant at temperatures of several hundreds of degrees Centigrade (C).

In examples, first material 601 may be a copper alloy (e.g., CuCrlZr copper) and the second material 602 may be steel that are joined using HIP. The two materials, made from are brought next to each within a HIP-capsule (not shown), and the materials are pressed against each other under the influence of HIP. The high pressure and temperature of HIP weld the materials together. The area where the two bodies are in contact with each other form the bond zone 603.

Diffusion alters the properties of the joined materials, near the bond zone 603. This may be problematic if any of the materials to be joined is an alloy of which the material properties are sensitive to small variations of the alloy composition. As a result, the joining may fail as a result of local depletion or accumulation of the alloy material, next to the bond zone 603.

As an example, first material 601 is CuCrlZr, which is a precipitation hardening copper alloy having high mechanical and electrical properties. CuCrlZr contains relatively small amounts of Cr (chromium) and Zr (zirconium), but these amounts ensure the mechanical strength of the first material 601, e.g., CuCrlZr. Joining CuCrlZr to steel (second material 602), for example under HIP, involves heating the materials to about 900 degrees C. for several hours. In the process, Cr diffuses from the first material 601, CuCrlZ, into the second material 602 (e.g., steel), which depletes and weakens the first material 601, e.g., CuCrlZ. The mechanical strength of the final composite structure becomes significantly less than the individual materials as a result of a depletion zone 603, which is a few micrometers wide within the first material 601 CuCrlZr.

Figure 6B:
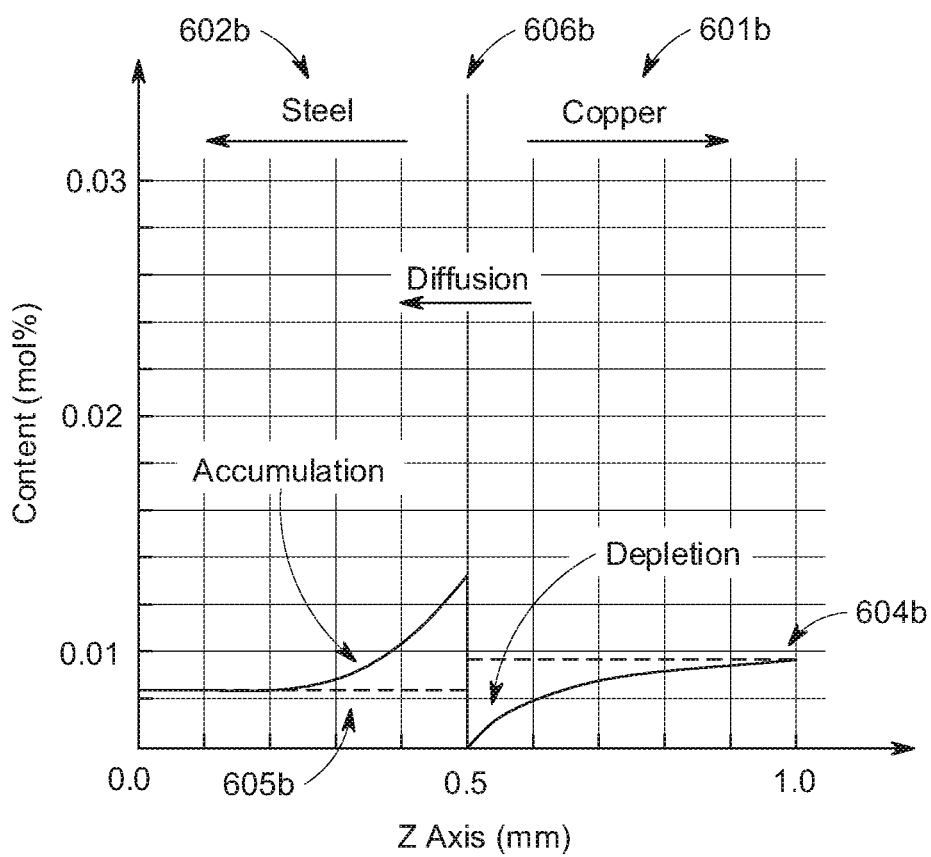
FIG. 6B is a graph illustrating diffusion.

FIG. 6B is a graph illustrating the diffusion of FIG. 6A of the concentration of the diffusing chemical species Cr along the Z axis, across the bond zone 603. The initial concentration, prior to bonding, of the diffusion element, Cr, is shown with a dashed line 605b on both sides of the interface 606b. In examples, the Cr concentration of one of the materials is different from the concentration of the other materials. FIG. 6B illustrates as such wherein copper 601b is shown having a higher concentration of Cr than steel 602b prior to the bonding. The solid line 604b represents the diffusing chemical species (e.g., Cr) concentration across the bond zone 603 after bonding. The copper 601b shows a depletion of the diffusing chemical species (e.g., Cr) at the bond zone 603 as a result of diffusion into the steel 602b. The steel 602b on the contrary shows an accumulation of Cr at the bond zone 603. Generally, the rate and direction of the diffusion depends on the concentration profile of the diffusing chemical species and the local material properties. In the example of FIG. 6B, the Cr concentration profile and chemical potential of the material species is such that the diffusion of Cr is from copper 601b to steel 602b.

The hardness and mechanical strength, in the case of CuCrlZr copper, depends critically on the Cr content. In FIG. 6B, the illustrated depletion of Cr weakens the copper 601b at and near the bond zone 603. The depletion reduces the mechanical tensile strength of the copper 601b and the bond zone 603, for example, by tens of percent.

Diffusion caused by bonding is a challenge when welding via hot isostatic pressing. Conventionally, manufactures have attempted to mitigate diffusion at the bond zone by introducing a diffusion barrier between the materials to be joined. However, diffusion barriers are different from the source-layer 704 described herein. Diffusion barriers typically comprise nickel (Ni), which may be a few micrometers thick, and are often introduced by methods such as plating. Typically, the barrier material remains within the structure as a thin interface layer after the welding process. The mechanical tensile strength of a bonding zone is equal to the tensile strength of the weakest material within the bonding zone or the weakest bond between materials of the bonding zone. As a result, because many barrier layers have weak tensile strength and the bond between barrier layers have weak tensile strength, mitigating diffusion at the bond zone by introducing a diffusion barrier between the bonding materials typically causes weakened bonds. It is these weakened bonds which have challenged the manufacturing process of solid-steel induction rotors.

Figure 7A:
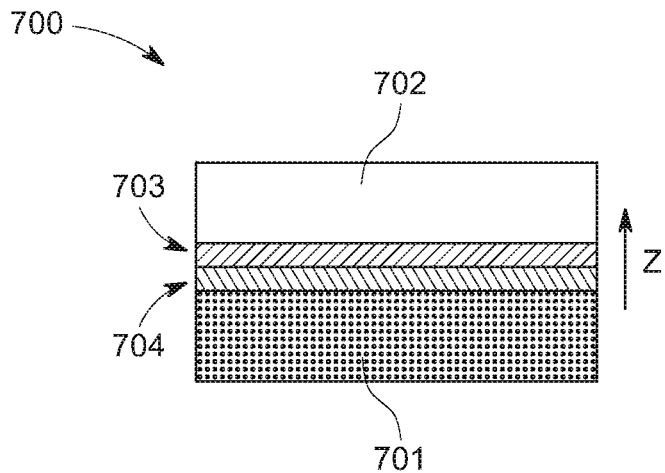
FIG. 7A is an exemplary block diagram illustrating bonded materials.

FIG. 7A is an exemplary block diagram illustrating bonded materials. In examples, component 700 may be a cross section of a solid steel rotor. In contrast to introducing diffusion barriers between materials to be bonded as described above, bonding joint 700 includes one or more source-layer 704 between the material 701 and material 702 that are being bonded. Source-layer 704 is different from the conventional use of diffusion barriers. For example, a diffusion barrier is a layer of material that is different from the materials being bonded. For example, when bonding steel and copper, the diffusion barrier will comprise elements that are different from the steel and copper, for example nickel. The barrier layer acts to prevent or minimize elements from the copper diffusing into the steel. In contrast, source-layer 704 is an enhancement layer and in examples comprises a chemical species that is expected to diffuse. Rather than preventing the diffusion of the diffusing chemical species, source-layer 704 encourages diffusion at a rate and location that strengthens the materials being bonded and the bonding joint 700.

The first material 701 comprises a higher concentration of a chemical species that is as compared to the second material 702 wherein the chemical species is expected to diffuse into the second material 702. The rate of diffusion is determinable based on factors including concentration of materials at the bond zone, temperature, time, type of bonding method, and the like. Based on these or more factors, source-layer 704 is selected and introduced between the first material 701 and second material 702 to be joined. For example, a source-layer 704 comprising a concentration level of first material 701's diffusing chemical species may be selected for introduction between first material 701 and second material 702. The concentration level of the diffusing chemical species of source-layer 704 may be selected to diffuse at a rate of diffusion as determined based on factors including concentration of materials at the bond zone, temperature, time, type of bonding method, and the like.

Introducing source-layer 704 enriches first material 701 with the diffusing chemical species. The thickness of the source-layer 704 may be from a nanometer up to a several micrometers (e.g., few nanometers up to a few micrometers), depending on the materials and the application. As a result, enriched first material 701 comprises an abundance of the chemical species, such that when the chemical species diffuses from first material 701 into second material 702, then first material 701 is left with a sufficient amount of the chemical species to maintain its original strength or even experience increased strength.

Accordingly, source-layer 704 enriches the depletion zone 703 by increasing the concentration of diffusing chemical species such that when the expected diffusion occurs during the bonding process, the depletion zone 703 maintains a predicable concentration of the diffusing chemical species, which ensures that the strength of the first material 701 and the strength of the depletion zone 703 is maintained at a level at least equal to the strength of the pre-bonded first material 701. In examples, source-layer 704 may be enriched with a concentration level of the diffusing chemical species that causes the depletion zone 703 to be purposefully stronger than the first material 701. When the depletion zone 703 is stronger than the first material 701, the joint of first material 701 and second material 702 is stronger than the material the joint bonds.

Figure 7B:
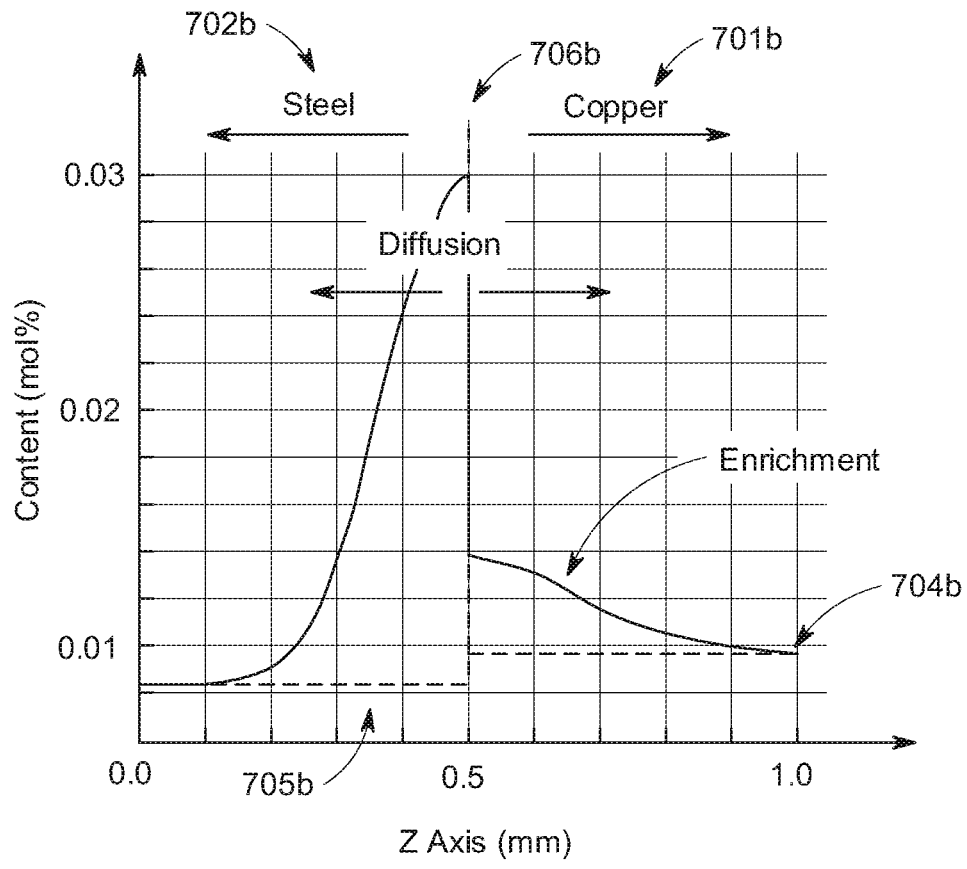
FIG. 7B is a graph illustrating diffusion.

FIG. 7B is a graph illustrating an example diffusion of the bond illustrated in FIG. 7A, wherein a source-layer 704b is deposited on one or more of the materials being joined. In this example, the source-layer 704b is Cr and is introduced between steel material 702 and copper material 701. In examples, source-layer 704b may be introduced via sputtering, electrolysis, doping, and/or the like. Source-layer 704b may be deposited on steal material 702, copper material 701, and/or both. In examples, source-layer 704b is introduced along one or more contact areas where diffusion control is desired. The thickness and/or concentration of source-layer 704b may be adjusted as desired to control the diffusion of Cr 704b into the first material 701b and the second material 702b, for example, during the bonding process.

FIG. 7B illustrates the variable Cr concentration within the bond zone 703 of FIG. 7A. The initial Cr concentration 705b (before welding) is shown with a dashed line on both sides of the interface 706b. It is noted that the Cr concentration is generally not the same in the two materials. The Cr source-layer is shown as a peak exactly at the interface 706b.

The solid line 704b of FIG. 7B represents the Cr concentration across the bond zone 703 after welding. The copper material 701 shows Cr enrichment next to the bond zone 703 as a result of Cr diffusion from the source-layer 704. Also, the steel material 702b shows enrichment of Cr next to the bond zone 703 after the welding. This enrichment is even stronger than that within the copper. In some examples, the source-layer 704 may completely dissolve into the bond zone and also prevent a diffusion-caused depletion from the copper material 701. As a result, rather than creating a mechanically weaker bond zone (due to depletion) a stronger bond zone 703 is created by source-layer 704 enriching the copper and steel.

In examples, HIP welding is used to join steel material 702 and copper material 701. At the welding area, steel material 702 is plated with a source-layer 704 comprising Cr and brought next to the copper material 701b within a HIP-capsule (not shown). The steel material 702 and copper material 701 are pressed against each other under the influence of HIP, which welds the materials to each other, as a result of the high pressure and temperature. Cr source-layer 704 is located at the area where the steel material 702 and copper material 701 are in contact with each other. A bond zone 703 is formed between the steel material 702 and copper material 701. Cr source-layer 704 is dissolved and diffused into the steel material 702 and copper material 701 to be joined if the Cr source-layer 704 is thin enough. In examples, it may be advantageous for the Cr source-layer 704 to fully dissolve and diffuse into the steel material 702 and copper material 701 because the final composite structure would lack an intermediary layer of a third material (e.g., a Cr source-layer). In examples, the mechanical strength of bond zone 703 may improve when the source-layer completely dissolves into the first and second material.

While an HIP example including copper material 701, enrichment layer 704, and steel material 702 is described above, any variety of materials (e.g., similar materials and/or dissimilar materials) may be joined according to any manner of bonding. In examples, one or both of them may or may not be alloys. The materials to be joined may be solids and/or comprise solid powder. The source-layer may comprise any material for which diffusion may be controlled and/or compensated. The source-layer may be introduced in a variety of manners including but not limited to electrolysis, plating, a foil layer, atomic layer deposition, vapor phase deposition, molecular beam epitaxy, and mechanical deposition. In examples, the source-layer forms a layer covering the whole weld or bond zone wherein diffusion compensation and control is desired. Some embodiments tune the thickness of the source-layer to control the dissolving result; for example, the source-layer's thickness may be tuned such that the source-layer is completely dissolved. In examples, the source-layer may be imbedded inside the surface of one or more of the materials according to processes used in semiconductor doping, for example, ion implantation.

In examples, the first material 701 may be an alloy of varying concentration, with the alloy designed such that the compound and/or element most likely to deplete during the bonding process is concentrated at or near bonding zones 703. For example, the first material 701 may be a copper alloy of varying concentration designed to have a higher concentration of Cr at or near bonding zones 703. In such examples, the first material's 701 Cr diffuses during the bonding process causing the same strengthening characteristics at the bonding zone 703 for the same reasons. Similarly, the second material 702 may be designed with varying concentrations. For example, steel 702 may be designed with concentrations of Cr at expected bonding zones 703, which would create the same strengthening characteristics at the bonding zone 703 for the same reasons.

Because including surface layers cause enrichment of the bonded materials, the bonded materials may be locally strengthened, and the bond therebetween becomes stronger. Further, properly dimensioned source-layers may completely dissolve into the joined materials preventing interface materials, which are typically weakened regions. No new chemical species need to be introduced to the composite structure because the surface layer comprises a chemical species of one of the materials being joined.

The inclusion of source-layers 704, as described above, and/or barrier layers, as described above, allow for alterative bonding methods (e.g., hot isostatic pressing (HIP)) that were heretofore impractical and/or unavailable for cladding solid steel rotors. In addition to other bonding techniques, examples herein clad solid steel rotors for high-speed motors using HIP. In an example manufacturing process, a copper cylinder is placed onto a steel shaft. A capsule is welded around the steel bar and the copper cylinder, and a vacuum or low-pressure is created within the capsule before closing the capsule around the steel bar and copper cylinder. The whole capsule is placed within a closed HIP chamber. Within the chamber an inert gas is heated until the gas pressure and temperature reach their holding values. The capsule, the clad and the steel are merged and welded together as a result of the very high gas pressure and temperature. When a sufficiently strong bond has been ensured, the gas temperature and pressure are ramped down. The parts are let to cool down and may be inspected for eventual faults. After this HIP process is complete, additional machining and assembly of the rotor may be performed, if desired.

Figure 8A:
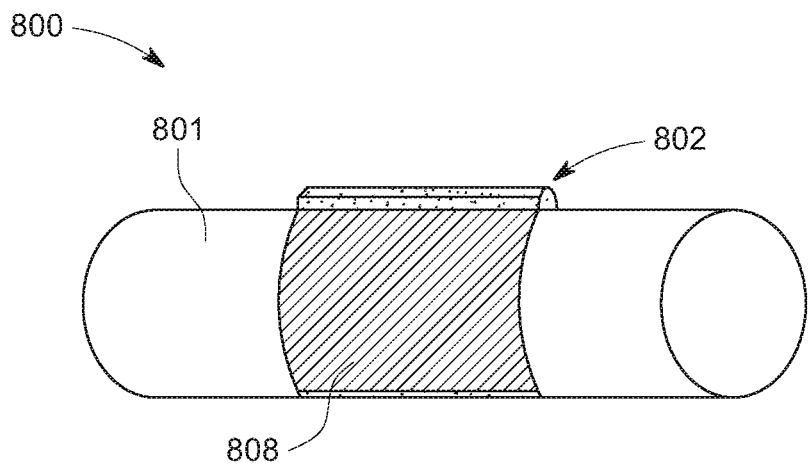
FIG. 8A illustrates an example rotor.
Figure 8B:
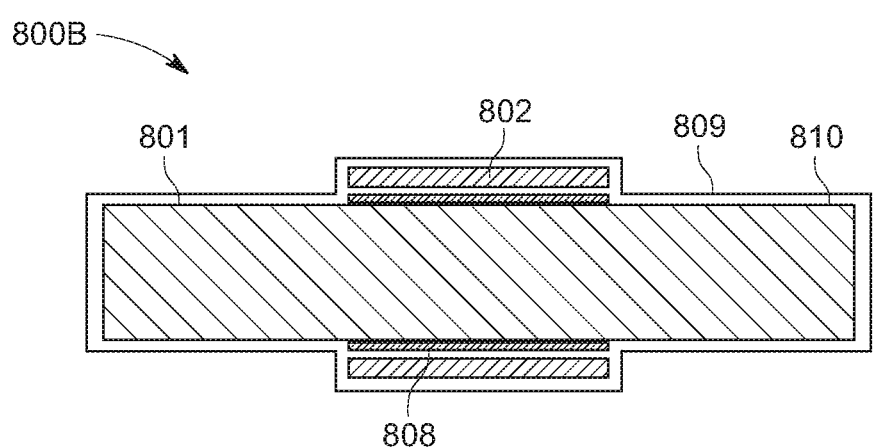
FIG. 8B is a block diagram illustrates an example capsule.

FIG. 8A illustrates an example rotor 800 that is formed in a capsule 800B. Shaft 801 comprises steel. Clad 802 forms a layer on the surface of shaft 801, with an intermediary layer 808 (e.g., comprising nickel, chromium, and/or the like) therebetween which improves the bond between shaft 801 and clad 802. In examples, intermediary layer 808 may be a source-layer 704 (as described above), which enriches elements and/or compounds of clad 802 and strengthens the bond between clad 802 and shaft 801. In examples, intermediary layer 808 may be a barrier layer that prevents or reduces diffusion between shaft 801 and clad 802. Shaft 801, clad 802, and the intermediary layer 808 are enclosed within an HIP capsule 809, and a vacuum cavity 810 is created within the HIP capsule 809. In examples, rotor 800, and the manufacture thereof, may omit intermediary layer 808.

Figure 9:
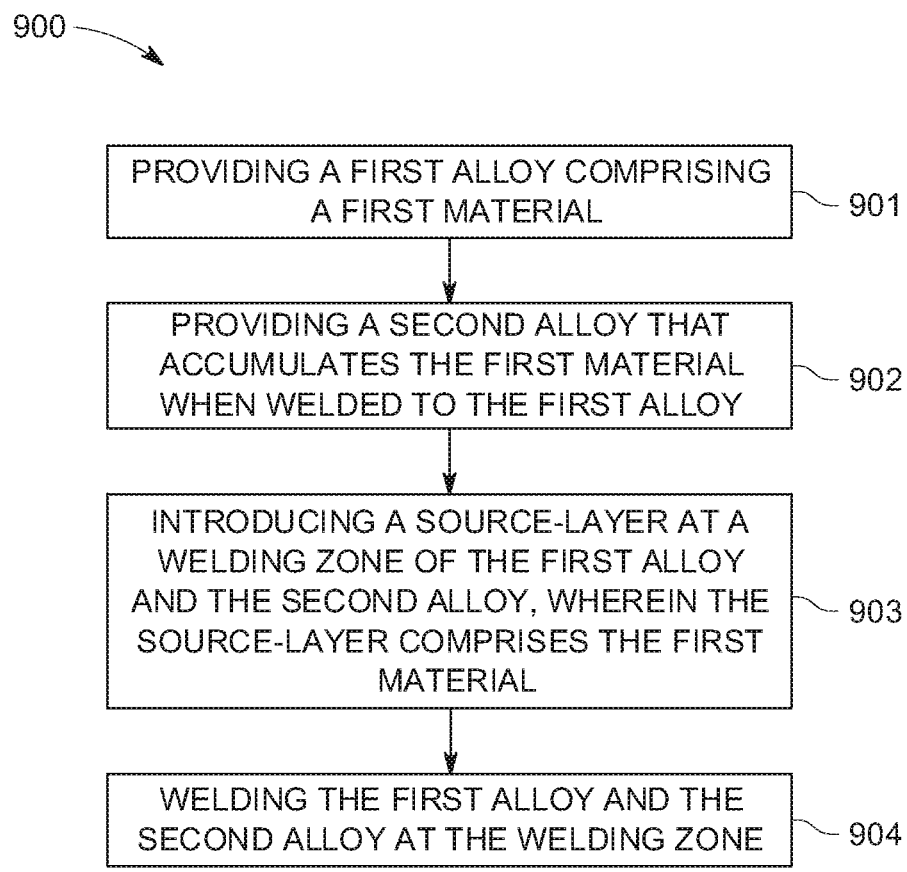
FIG. 9 is a block diagram illustrating an example method of making a rotor.

FIG. 9 is an example block diagram illustrating an example method 900 of making an example rotor. Operation 901 provides a first alloy comprising a first material. Operation 902 provides a second alloy that accumulates the first material when welded to the first alloy. Operation 903 introduces a source-layer at a welding zone of the first alloy and the second alloy. The source-layer comprises the first material. Operation 904 welds the first alloy and the second alloy at the welding zone. Any bonding technique discussed herein may be used at operation 904 (e.g., operations 203-209 of FIG. 2).

Figure 10:
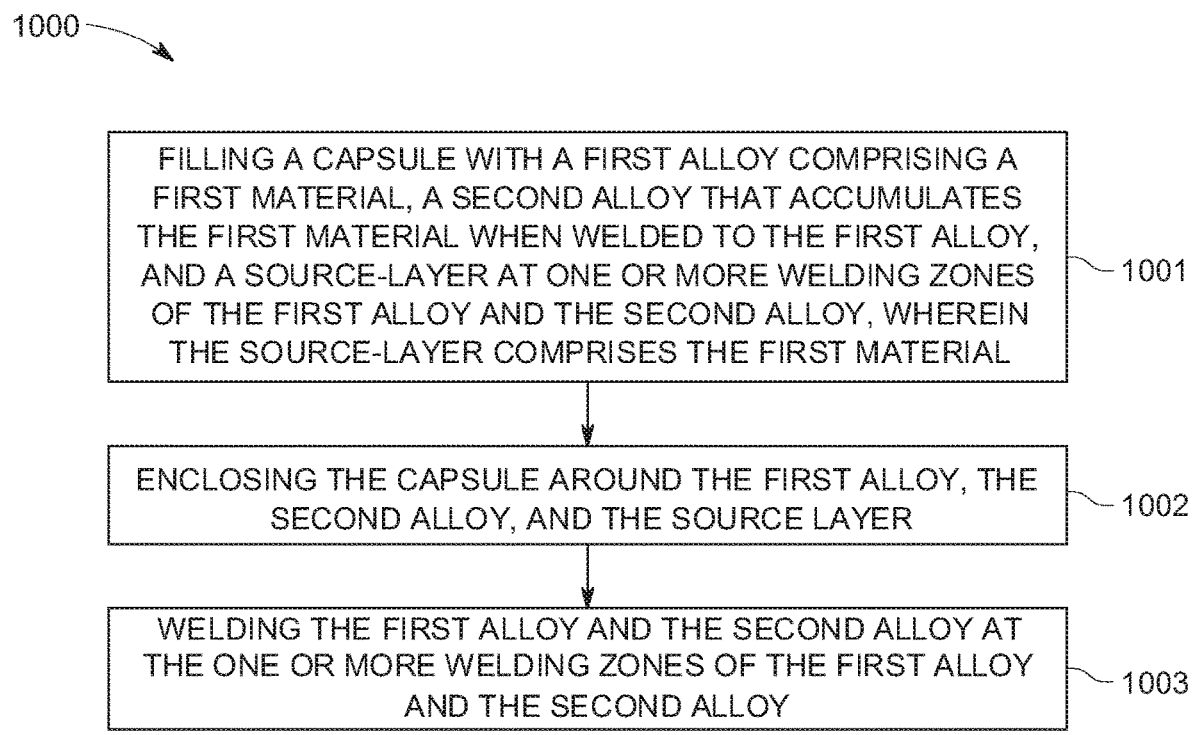
FIG. 10 is a block diagram illustrating an example method of making a rotor.

FIG. 10 is an example block diagram illustrating an example method 1000 of making an example rotor. Operation 1001 fills a capsule with a first alloy comprising a first material, a second alloy that accumulates the first material when welded to the first material, and a source-layer at one or more welding zones of the first alloy and the second alloy. The source-layer comprises the first material. Operation 1002 encloses the capsule around the first allow, the second alloy, and the source-layer. Operation 1003 welds the first alloy and the second alloy at the one or more welding zones of the first alloy and the second alloy. (e.g., operations 203-209 of FIG. 2).

The examples and designs illustrated and described herein as well as examples and designs not specifically described herein (e.g., rotor designs not specifically illustrated in the figures) are within the scope of aspects of the disclosure. The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure is susceptible to various modifications and alternative constructions, certain illustrated examples thereof are shown in the drawings and have been described above in detail. It should be understood, however, that there is no intention to limit the disclosure to the specific forms disclosed, but on the contrary, the intention is to cover all modifications, alternative constructions, and equivalents falling within the spirit and scope of the disclosure.

What is claimed is:

1. A method of manufacturing a solid steel rotor comprising:
   providing a solid steel rod having a variable diameter in a capsule, the steel rod having a surface comprising grooves formed along at least a portion of the surface;
   machining the solid steel rod to include shoulders;
   providing an alloy powder layer in the capsule positioned around select portions of the solid steel rod over the grooves and such that the alloy powder layer covers the shoulders of the solid steel rod, the powder layer comprising alloy material that is different from the steel of the solid steel rod;
   placing steel end rings around the solid steel rod, the steel end rings located at opposite ends of the select portions of the alloy powder layer;
   closing the capsule;
   introducing the capsule into a hot isostatic pressing chamber; and
   increasing pressure and temperature within the chamber causing:
   the powder layer to compress into a cladding over the grooves of the solid steel rod, and
   the cladding to weld to the solid steel rod, wherein the cladding forms recessed short circuit rings on the solid steel rod.

2. The method of claim 1, wherein the powder layer is positioned at least in the grooves.

3. The method of claim 1 wherein the increasing pressure and temperature within the chamber further causes the steel end rings to weld to the solid steel rod and the cladding the steel end rings increasing the structural integrity of the solid steel rod.

4. The method of claim 1, wherein the capsule is a mold, and wherein the increasing pressure and temperature within the chamber further causes the alloy powder layer to compress into a cladding shaped according to the mold.

5. The method of claim 1 further comprising:
   providing an intermediate layer between the solid steel rod and the alloy powder layer at a welding zone.

6. The method of claim 5, wherein the intermediate layer comprises at least some material that is the same of the solid steel rod.

7. The method of claim 5, wherein providing an intermediate layer comprises:
   doping a surface of the solid steel rod.

8. The method of claim 5, wherein the intermediate layer diffuses into the solid steel rod and the powder layer.

9. A method of manufacturing an electro-magnetic rotor comprising:
   filling a capsule with a solid rod comprising a first alloy, the solid rod having shoulders, wherein the first alloy comprises a first material and wherein the solid rod comprises a surface having grooves formed along at least a portion of the surface, a second alloy that accumulates the first material in the grooves of the solid rod when welded to the first alloy, the second alloy covering the shoulders of the solid rod and forming recessed short circuit rings on the solid rod, and a source-layer at one or more welding zones of the first alloy and the second alloy, wherein the source-layer comprises the first material;
   placing end rings around the solid rod, the end rings located at opposite ends of the second alloy, the end rings comprising the first material and configured to increase the structural integrity of the solid rod;
   enclosing the capsule around the first alloy, the second alloy, the end rings, and the source-layer; and
   welding the first alloy and the second alloy at the one or more welding zones of the first alloy and the second alloy inside a hot isostatic pressing chamber.

* * * * *